(12) United States Patent
Stedman et al.

(10) Patent No.: US 6,262,726 B1
(45) Date of Patent: Jul. 17, 2001

(54) FACTORY INSTALLING DESKTOP COMPONENTS FOR AN ACTIVE DESKTOP

(75) Inventors: Roy W. Stedman; James McGlothlin, both of Austin, TX (US)

(73) Assignee: Dell U.S.A., L.P., Round Rock, TX (US)

( * ) Notice: Subject to any disclaimer, the term of this patent is extended or adjusted under 35 U.S.C. 154(b) by 0 days.

(21) Appl. No.: 09/169,324

(22) Filed: Oct. 9, 1998

(51) Int. Cl.$^7$ .................................. G06F 3/00; G06F 9/24
(52) U.S. Cl. .................. 345/333; 345/326; 345/335; 345/339; 709/328; 713/1; 717/11
(58) Field of Search ...................... 345/326, 329, 345/333–335, 339, 348; 709/203, 328, 331–332; 710/10; 713/1; 717/11

(56) References Cited

U.S. PATENT DOCUMENTS

| | | | |
|---|---|---|---|
| 5,621,878 | 4/1997 | Owens et al. ................. | 345/326 |
| 5,634,058 | 5/1997 | Allen et al. .................. | 717/11 |
| 5,675,831 | 10/1997 | Caputo ........................ | 710/10 |
| 5,680,547 | 10/1997 | Chang ......................... | 709/222 |
| 5,721,825 | 2/1998 | Lawson et al. ............... | 709/203 |
| 5,732,282 | 3/1998 | Provino et al. .............. | 709/324 |
| 5,740,422 | 4/1998 | Foltz et al. .................. | 707/9 |
| 5,815,712 | * 9/1998 | Bristor et al. ............... | 345/333 X |
| 5,838,322 | * 11/1998 | Nakajima et al. ........... | 345/348 |
| 6,061,695 | * 5/2000 | Slivka et al. ................ | 345/333 X |
| 6,078,747 | * 6/2000 | Jewitt ......................... | 717/11 |

FOREIGN PATENT DOCUMENTS

| | | | | |
|---|---|---|---|---|
| 712 080 | * | 5/1996 | (EP) | ................... G06F/11/00 |
| 817 026 | * | 1/1998 | (EP) | ................... G06F/9/46 |

OTHER PUBLICATIONS

Ron Person et al., "Using Windows 95," QUE, p. 37–39, 1997.*

* cited by examiner

Primary Examiner—Raymond J. Bayerl
Assistant Examiner—X. L. Bautista
(74) Attorney, Agent, or Firm—Skjerven Morrill MacPherson LLP; John A. Odozynski

(57) ABSTRACT

A manufacturing process, computer system and method for modifying a graphical user interface and allow customization of the graphical user interface, such as a windows type operating system. Manufacturing process copies operating system, configuration files, application programs, graphical image files, and installation programs onto the computer systems nonvolatile storage device. Configuration files trigger the installation programs to execute upon the first invocation of the operating system by the user and install the custom desktop components. Configuration files may include a registry. Installation programs add graphical images related to applications or Active Desktop components. A plurality of users with separate profile and desktop layouts for each user may have each of the plurality of user's graphical user interface modified. Removal of the graphical image may following the execution of the related application or Active Desktop component.

30 Claims, 9 Drawing Sheets

FACTORY INSTALLING DESKTOP COMPONENTS FOR AN ACTIVE DESKTOP

BACKGROUND

1. Field

This field relates to software, and more particularly for software to customize an operating system upon a first execution by a user and improvements in the manufacturing process of computer systems by utilizing such improvements.

2. Description

Computer systems in general and International Business Machines (IBM) compatible personal computer systems, in particular, have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a group of users in the case of personal computers which serve as computer server systems) and are inexpensively priced for purchase by individuals or small businesses. A personal computer system may also include one or a plurality of devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices.

Manufacturers of personal computers often pre-install an operating system, such as the Microsoft Windows 95™ operating system, the Microsoft Windows NT™ operating system, or the IBM OS/2™ operating system. These modem operating systems are increasingly large in term of both complexity and storage requirements, often requiring several megabytes of hard drive space. When a manufacturer installs an operating system, the manufacturer often uses another computer to copy an image of the operating system from a separate hard drive onto the target hard drive being created for the customer using a specialized software program.

Copying an image of a hard drive, rather than installing the operating system on each customer system, saves considerable time. However, once the image is created, it is quite difficult to customize the customer's system without either creating and copying a new image or tuning on the customer's machine and providing the customizations.

Creating multiple images and copying the image most suited to the customer's request is helpful when installing standard applications, such as the Microsoft Office™ suite of applications, which are requested for multiple customers. Multiple images increases the complexity of the manufacturing process as well as increasing the computer requirements for making the images available to the installation process. Furthermore, the manufacturer may wish to make small customizations to help the user get acquainted with the new computer and to help build brand identity and loyalty for the manufacturer. In addition, some large corporate customers may request a particular custonization, such as an application to display the corporate PC usage guidelines to the customer's employee.

SUMMARY

A computer system and method for modifying a graphical user interface of the present invention allows customization of the graphical user interface, such as a Windows™ type operating system. When invoked, the system reads one or more configuration files related to the operating system, which invokes an installation program to install the custom desktop components. These configuration files may include a registry. The custom desktop component includes graphical images added to the graphical user interface during such first invocation. The graphical image is related to an application or Active Desktop component which will be executed when the user selects the graphical image from the desktop layout. The computer system and method may also allow for several users to use the same computer system with a separate profile and desktop layout for each user. In such multiple user systems, the modification occurs for each of the several users. Following the execution of the application or Active Desktop component, the system may remove the graphical image associated with such application or Active Desktop component from the graphical user interface.

A manufacturing process of the present invention is useful in manufacturing systems with graphical user interfaces that are modified upon a first invocation by the user. The manufacturing process includes copying the operating system, configuration files, application programs, graphical image files, and installation programs onto the computer systems nonvolatile storage device. The configuration files are set to trigger the installation programs to execute upon the first invocation of the operating system by the user. The installation programs have been customized to perform modifications to the graphical user interface as described above.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
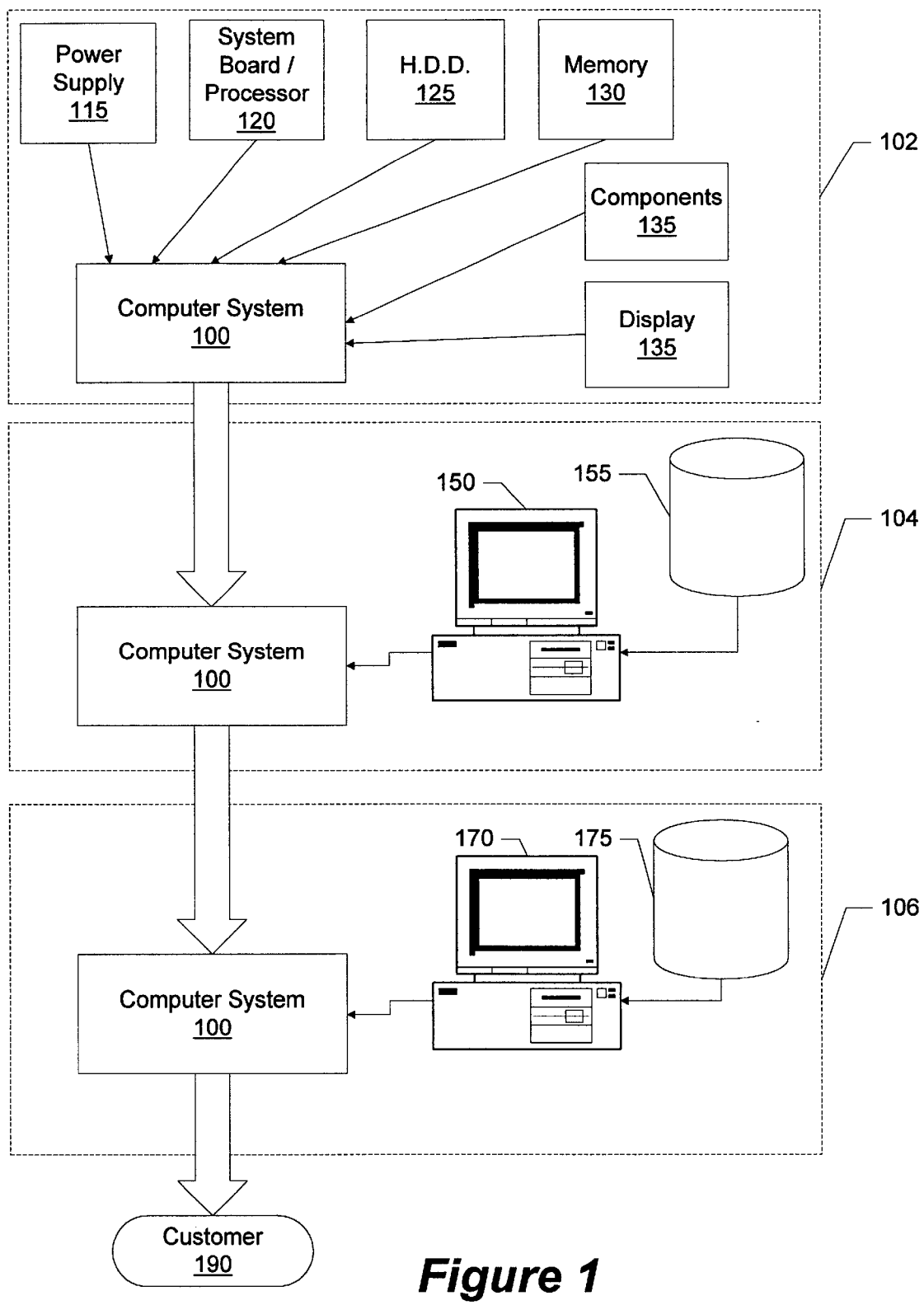
FIG. 1 is a block diagram showing a manufacturing process according to the present invention.

A personal computer manufacturing process is shown in FIG. 1. Computer system 100 is first assembled at hardware manufacture section 102 with various hardware components, including a power supply 115, a system board with a processor 120, a nonvolatile storage device 125, and memory 130. Additional components 135 may also be installed and may include items such as a tape drive, a compact disk read-only-memory (CD-ROM), as well as other components that may have been ordered by the customer. Nonvolatile storage device 125 may be a hard disk drive or any device that holds information when the computer system is powered off.

After the hardware of computer system 100 is installed, computer system 100 is transferred to software installation section 104. During software installation section 104, a standard operating system and applications are installed by manufacturing computer system 150. Manufacturing computer system 150 reads disk images 155. Disk images 155 are stored onto a nonvolatile storage device by various means known by those skilled in the art Manufacturing computer system 150 may also install selected components from software products to further customize computer system 100. Software packages and suites, such as Microsoft Office™, contain several software applications. In the case of Microsoft Office™, the suite contains a word processor (Microsoft Word™), a spreadsheet (Microsoft Excel™), a database (Microsoft Access™, a presentation application (Microsoft Powerpoint™), and a personal information manager (Microsoft Outlook™). Customers may request that any one or more of such applications from the suite be installed onto computer system 100. Manufacturing computer system can also be used to install such applications onto computer system 100. Computer system 100 is powered up and assists in the installation process and may also execute installation programs to install applications onto nonvolatile storage device 125. One method of creating a disk image is to manually create a model computer system configuration and use specialized software to copy an image of the disk from the model computer system. The operator of manufacturing computer system 150 may be a person or an automated program which determines which disk image should be installed to the nonvolatile storage device 125 previously installed in computer system 100.

To assist in the customization of computer system 100, a generic installation program and modified configuration files may be included in disk image 155 stored on and loaded onto the nonvolatile storage device 125 previously installed in computer system 100. The modified configuration files could contain instructions for the operating system to execute the generic installation program on the first invocation of the operating system by the end user, as is further described below.

Following software installation section 104 computer system 100 is in a condition which would allow it to be used by an end user. However, no customization has been performed at this point so the user could not be given special instructions or provided with customized information. At this point, computer system 100 is transferred to customization section 106. During customization section 106, computer system 100 may be customized by storing customized installation programs, applications and graphic files (collectively, "custom components") to nonvolatile storage device 125. Custom installation system 170 is used to transfer custom components 175 from a nonvolatile storage device connected to custom installation system 170. As will be appreciated by those skilled in the art, manufacturing system 150 and custom installation system 170 may be the same system. In addition, disk images 155 and custom components 175 may be stored on the same nonvolatile storage device. In addition, a local area network (LAN) may be used to connect manufacturing system 150 and custom installation system 170 to nonvolatile storage devices containing disk images 155 and custom components 175.

Configuration files used by the operating system installed on computer system 100 may to be modified to instruct the operating system to call the customized installation program upon the first invocation of the operating system by the end user. The customized installation program could be programmed to search for other customized components 175. As will be appreciated by those skilled in the art the installation program could use several methods to search for other custom components 175, including providing a data file providing installation details about the customized components, which is read and processed by the installation program. The customized installation program could also be used to remove standard icons or programs that normally are included with the operating system that the purchaser does not want users to use. These may include games or Internet browser programs (i.e., Microsoft Internet Explorer™, Netscape Navigator™) or any other application included with the operating system that the purchaser does not want employees using. In addition, the installation program could be programmed to handle errors encountered when searching for custom components 175 so that the end user would not see error messages if custom components 175 were not installed on computer system 100. This would allow a generic installation program to be placed on every computer system 100 from disk images 155 regardless of whether custom components 175 were loaded onto the nonvolatile storage device 125 of computer system 100.

The modification of the operating system can take place in several ways, two of which are disclosed below. First, the configuration files are modified prior to creating disk image 155 so that subsequent installations of the operating system would already contain the modified configuration files. A second method for modifying the configuration files occurs during the installation of custom components 175 by custom installation system 170. A manufacturer may choose to not provide custom components on every computer the manufacturer ships to customer at step 190. The first method advantageously increases speed as the installation file and modified configuration files are copied to the nonvolatile storage device 125 of computer system 100 prior to the copying of custom components 175 onto the nonvolatile storage device 125 of computer system 100. The second method advantageously avoids modifying the configuration files and placing the installation program onto the nonvolatile storage device 125 of computer system 100 unless custom components 175 are loaded by custom installation system 170. Following the loading of custom components 175, computer system 100 is ready for shipment to a customer at step 190.

Figure 2:
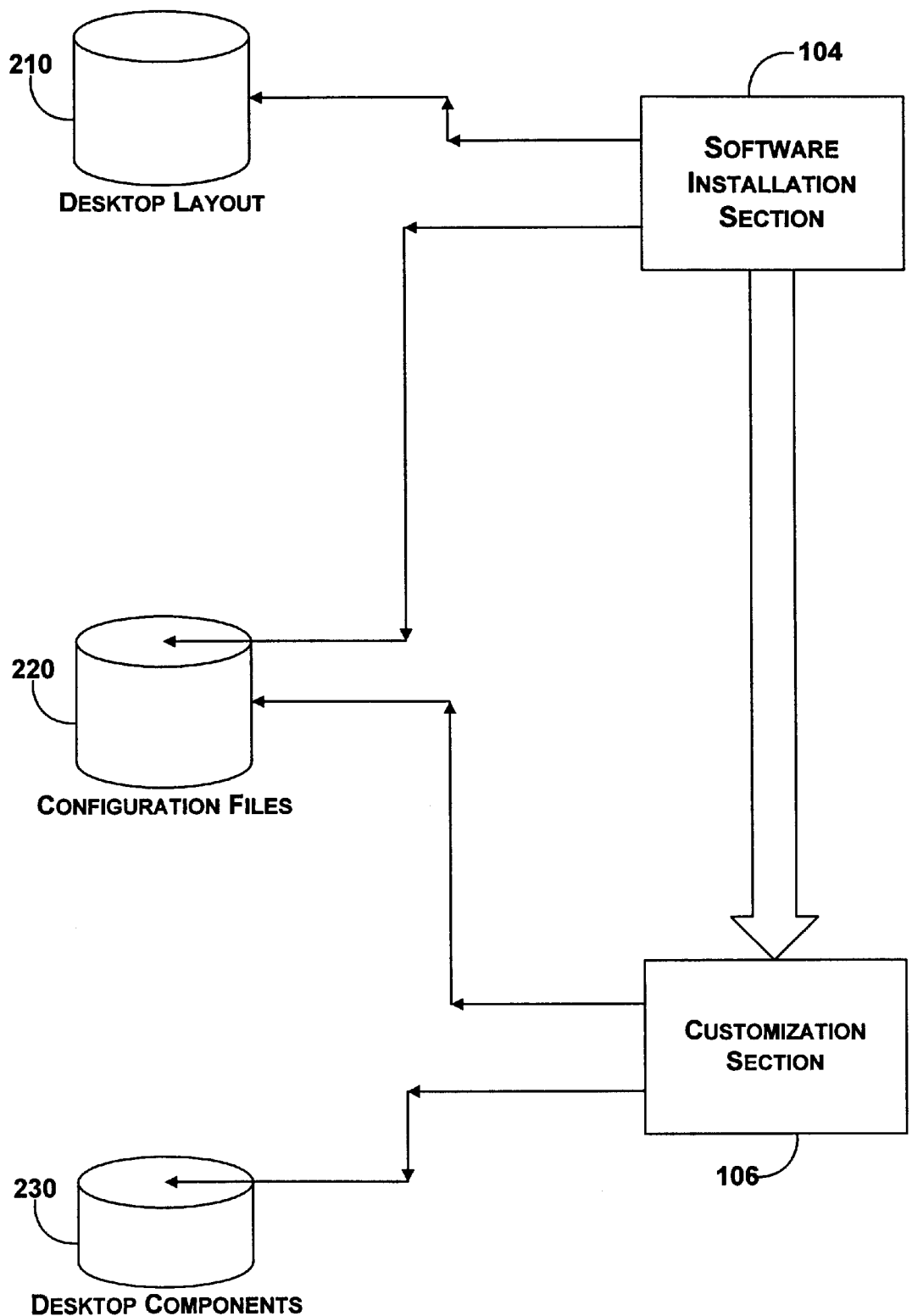
FIG. 2 is a block diagram showing the installation of the operating system and customizations according to the present invention.

FIG. 2 shows the software installation section 104 and customization section 106 process from the perspective of computer system 100. Files loaded onto the nonvolatile storage device 125 of computer system 100 include files for displaying a desktop layout 210 and configuration files 220. In some operating system, such as Windows 95™ and Windows NT™, the configuration files form a registry for storing configuration information in Windows 95™, configuration information is stored in system files named system.dat and user.dat. The registry is divided into six sections containing "keys" and "subkeys." A utility called a "registry editor" (regedit.exe) is included with Windows 95™ for viewing the keys and subkeys. One of the keys provided by Windows 95™ is called a "run once" key which, as its name implies, only runs the program associated with the key one time. A key of this nature is useful when the end user is installing software purchased by the end user. The software installation program may load software onto the users hard drive, modify the system settings, and need to re-boot the system in order to execute the software. Configuration files 220, such as the registry are used in a novel way to customize the operating system display upon a first invocation of the operating system by the user and provide the customization and manufacturing advantages as discussed above. During customization section 106, configuration files 220 are modified to correspond with desktop components 230 so that desktop components 230 are installed upon the first invocation of the operating system by the user.

Figure 3:
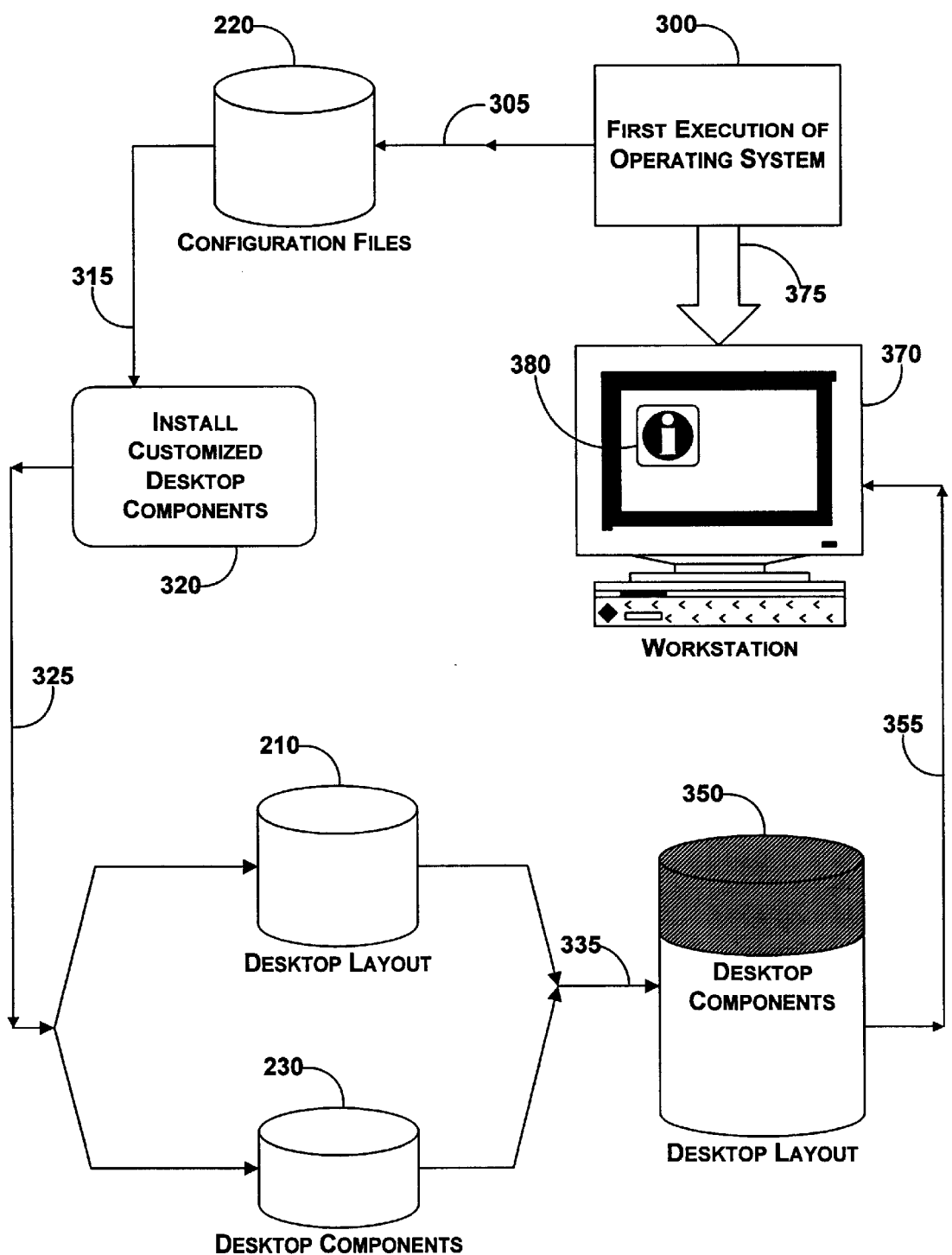
FIG. 3 is a block diagram showing the first execution of the operating system according to the present invention.

FIG. 3 shows generally a first execution of operating system 300 by an end user. Upon first execution of operating system 300, the operating system 300 reads configuration data from configuration files 220. The stored configuration files 220 within operating system 300 instruct operating system 300 to execute installation program 320 to install customized desktop components 230. Installation program 320 reads desktop component information 230 which includes one or more graphical images 380 associated with the desktop components 230. The installation program 320 then modifies the desktop layout 210 used by operating system 300 to display a new desktop layout 350 to the end user. The new desktop layout 350 includes graphical portions of desktop components 230.

A delay may be present between operating system 300 reading the configuration files 220 at step 305 and presenting the desktop layout at step 355. Ideally, the modification of the desktop layout 210 would complete prior to the operating system's display of the desktop layout at step 355. However, due to the nature of some operating systems, namely multiprocessing and threading of parallel processes, graphical objects, including the installed graphical image 380, may continue to appear for a short while after desktop layout 350 is displayed to the end user on his or her display device 370.

For some applications, it may be desirable to display graphical image 380 larger than other icons and graphics located on desktop layout 350 to draw user attention and encourage the end user to select graphical image 380. Information conveyed to the end user through selection of graphical image 380 may be introductory information, policy statements, marketing information from the manufacturer, or other types of information to be reviewed by the user once, but the graphic image does not have to remain prominently displayed on the user's screen. Active Desktop components may also be placed on desktop layout 350. Active Desktop components allow placement of embedded objects, such as Internet Web pages and the like, onto desktop layout 350. This allows placement of a link to an Internet Web page from the user's address so that the contents of the Web Page may periodically change without changing desktop layout 350.

Figure 4:
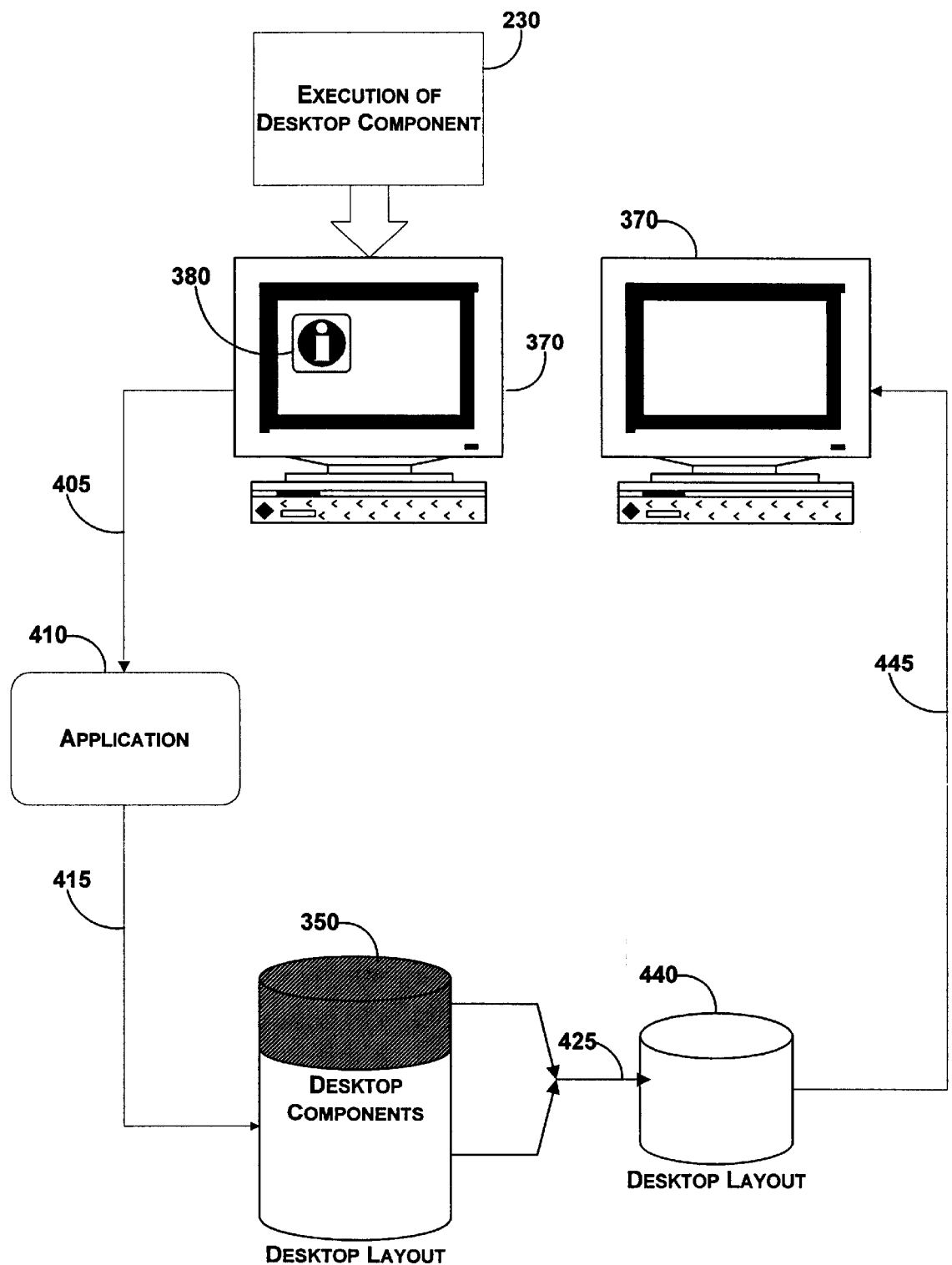
FIG. 4 is a block diagram showing the execution of a customized application according to the present invention.

FIG. 4 shows a method by which a customized desktop component 230 application may remove its associated graphical image 380 following execution of the customized desktop components 230. When the user selects graphical image 380 from user display 370, using a mouse or other input device, operating system 300 executes application program 410. Upon execution of application 410, desktop component files including associated graphical image 380 are removed from desktop layout 350 resulting in new desktop layout 440. New desktop layout 440 may be much like the original desktop layout 210 shown in FIG. 3. As an alternative, application 410 could modify desktop layout 350 by removing the larger graphic image 380 with a smaller icon-sized image (not shown) for incorporation with new desktop layout 440. When the application program is completed, user display 370 no longer includes graphical image 380, although, as described above, it may contain a smaller icon-sized image instead (not shown).

Figure 5:
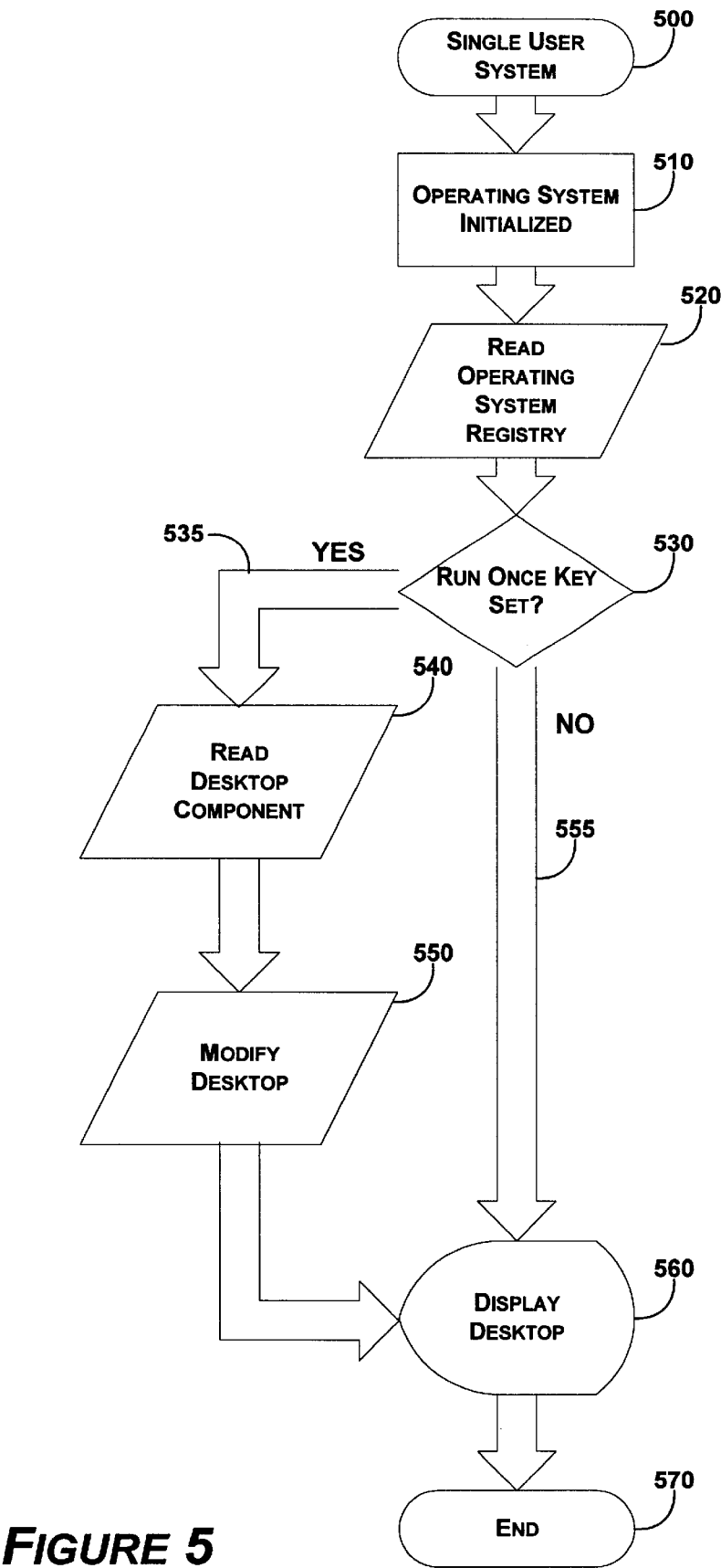
FIG. 5 is a flow chart showing the modification of the end user's desktop upon a first execution of a single-user operating system.

FIG. 5 shows a flowchart depicting, in general, how single computer system 500 uses a run once key under Windows 95™ to modify the desktop. When the user switches the computer system power on for the first time, the operating system 510 is initialized as installed by the manufacturer. As part of normal processing, read configuration files step 520 reads the configuration files 220 for a variety of system settings. As part of the manufacturer's installation process previously described, if run once key 530 is set, operating system performs customization functions on flow 535. These functions include desktop component installation information reading step 540 and desktop mod g step 550. Display desktop step 560 then displays the custom modifications from flow 535 to the user.

It is important that the customization functions are performed once but only once. Performing customization functions on flow 535 multiple times (i.e., upon each invocation of the operating system) could cause multiple graphic files to be written to desktop display 560 clutter the desktop display, cause unnecessary delays in booting the operating system, and could ultimately cause performance degradation of the computer system. In Windows 95™, a run once key runs a process one time and then removes the entry from the registry. In other operaing systems, configuration files 220 may be used which would need to be modified by the installation program during its first invocation. In this manner, a subsequent invocation of operating system 510 by a single user would read the registry 520 and not find the run once key 530 that was originally set by the manufacturer. In this case, flow 555 would execute and the desktop display 560 would be shown to the user without performing customization functions on flow 535.

Figure 6:
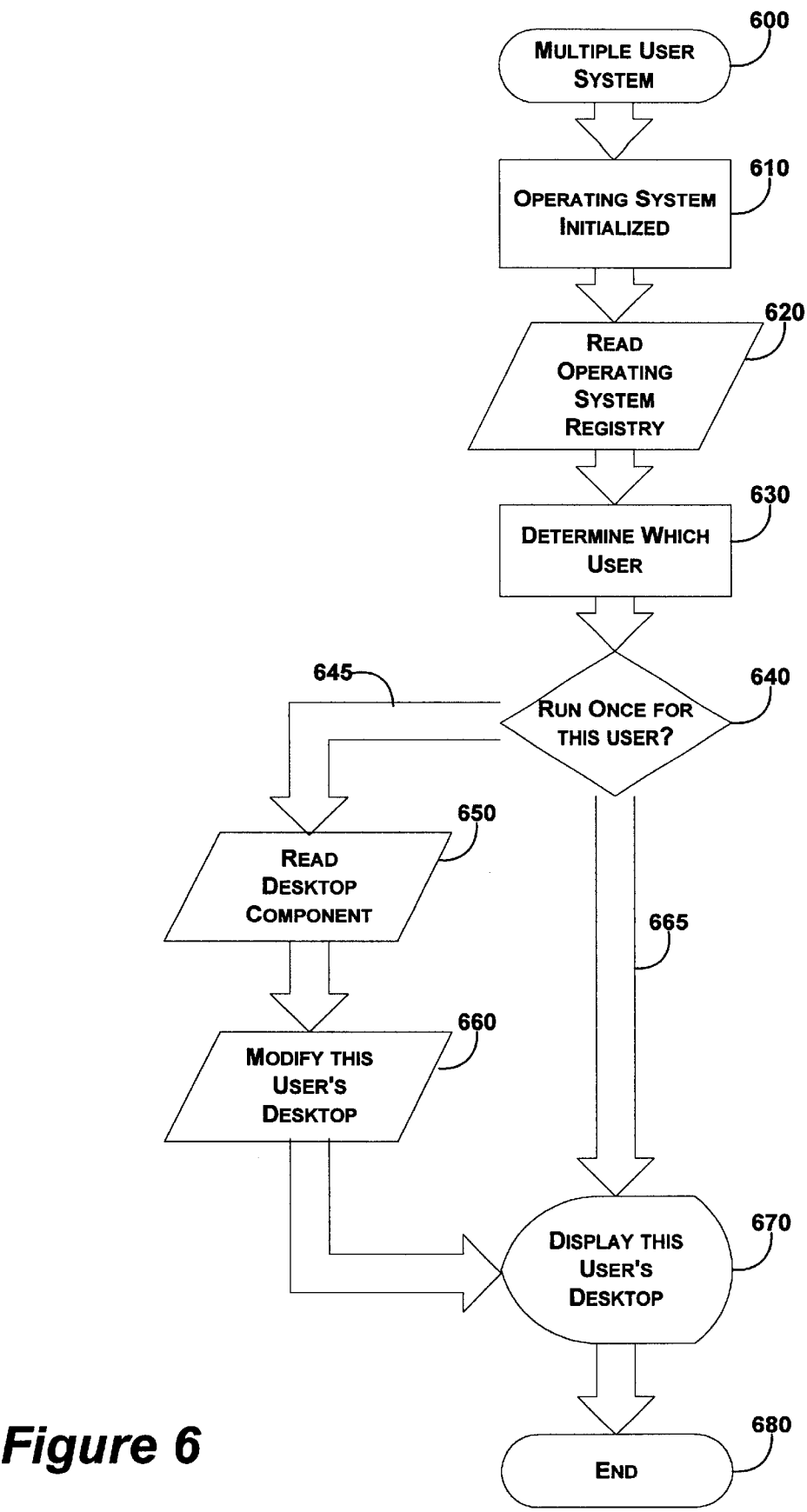
FIG. 6 is a flow chart showing modification of the end user's desktop upon a first execution for each user a multiple-user operating system.

Some operating systems, including Microsoft Windows NT™, can support multiple user configurations. FIG. 6 shows a flow diagram for handling multiple user operating system. In multiple user system 600 more than one end user can be registered to use the computer system. Each of the users in a multiple user system has a desktop layout 210 which may be customized so that each user can have his or her own unique desktop layout 210. In order to initialize the operating system, the user must enter his or her username and password. This information identifies the user uniquely to the operating system. Configuration files 220, the registry in Windows NT™, keeps track of the particular user using the operating system. The configuration files 220 maintain a profile for each user, which includes the details of the desktop layout 210 for the particular user. When operating system is invoked for the first time at step 610, the registry containing the user profile is read along with a run once key. The user would have entered their user name and password upon invoking the operating system, identifying the user to the operating system. Windows NT™ version 4.0 or 5.0 does not contain a "run once for every user" key so some amount of computation must be performed to determine whether flow 645 has been previously executed for this user to read the desktop component 650 and modify this user's desktop 660. One way decision 640 could be undertaken would be a simple file with a list of the registered users from the registry and a flag for whether the particular user has performed flow 645 (i.e., read the customized desktop component 650 and modified the user's desktop layout 660). For every user who has not had their desktop layout customized, flow 645 would be executed before the operating system would display the user's desktop 670. On the other hand, if the flag was set, then decision 640 would be positive (yes) and the operating system would follow flow 665 and display the user's desktop 640 without executing flow 645.

Figure 7:
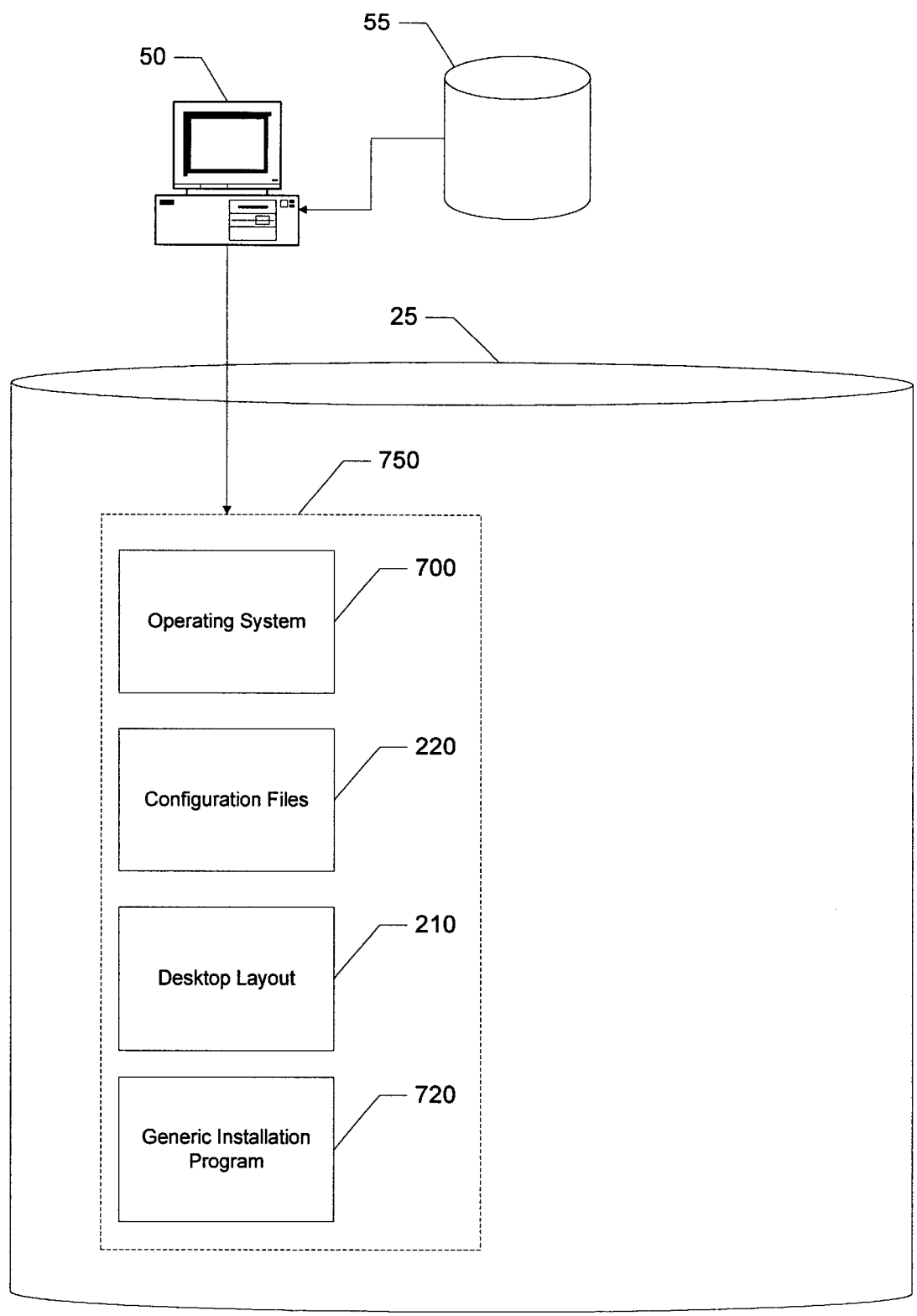
FIG. 7 is a block diagram showing a generic installation program and operating system installed to a nonvolatile storage device during manufacturing.

Turning now to FIG. 7, the disk image 155 is copied by manufacturing system onto nonvolatile storage device 125 of the computer system 100 (not shown), as shown above (see, e.g., FIG. 1). FIG. 7 shows more particularly the files contained in disk image 155 and copied to nonvolatile storage device 125 to enable generic installation of custom components. Following the copying of disk image 155, nonvolatile storage device 125 includes the operating system 700 as provided by the operating system manufacturer, desktop layout 210, also as provided by the operating system manufacturer. In addition, generic installation program 720 is included in disk image 155 and copied to nonvolatile storage device 125. Configuration files 220, i.e., registry files, are modified to include instructions to execute generic installation program 720 upon the operating systems next invocation. The standard files 750 copied to nonvolatile storage device 125, includes operating system 700, configuration files 220, desktop layout 210, and generic installation program 720.

To create disk image 155 to contain the aforementioned files, the operating system would be installed onto a new hard disk drive, the generic installation program would be copied to the same hard drive, and the configuration files 220 would be modified so that the operating system would be instructed to invoke the generic installation proven upon the operating system's next invocation (i.e., in Windows 95™ modifying a "run once" registry key to add the name of the generic installation program). At this point, an image of the hard disk (as modified) would be taken to create disk image 155.

Figure 8:
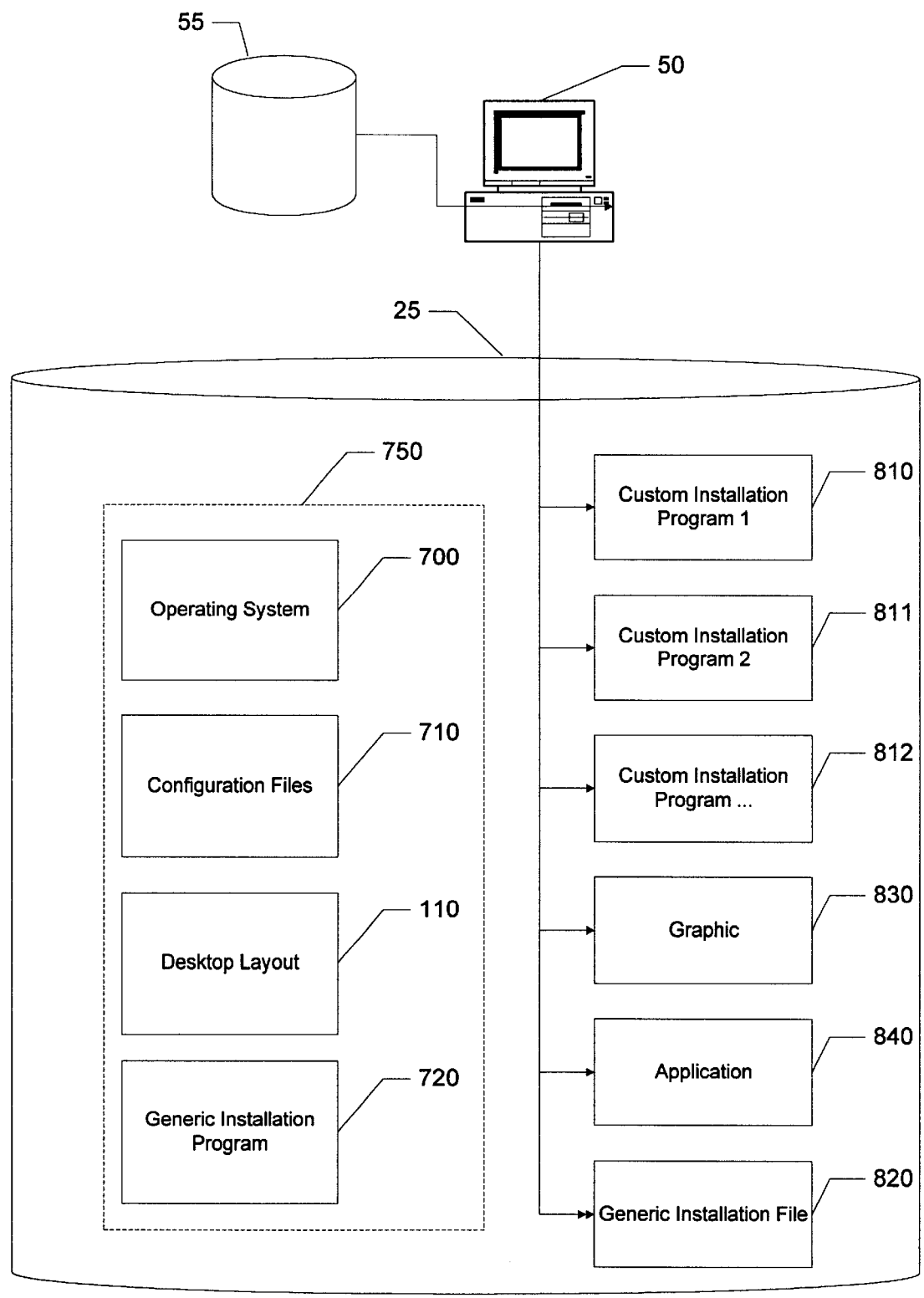
FIG. 8 is a block diagram showing custom installation files installed to a nonvolatile storage device during manufacturing.

FIG. 8 shows the custom components that are copied using custom installation system 170 from nonvolatile storage device 25 containing custom components 175 to nonvolatile storage device 125 of computer system 100 (not shown). Standard files 750 were previously installed onto nonvolatile storage device 125 as described above. Custom installation system 170 copies customization files onto nonvolatile storage device 125 to customize computer system 100 for the end user. Decisions related to the type and quantity of customized files, and therefore the customization performed, on the end user's computer depends on the manufacturer's intention and customizations that may have been requested by the customer (i.e., a corporation may wish to have certain customizations installed on every personal computer it orders for its employees). Custom installation program 810 is copied to nonvolatile storage device 125 along with a corresponding entry written to generic installation file 820 which identifies the name of custom installation program 810. Generic installation file 820 has a specific name or handle so that generic installation program 720 can read entries from generic installation file 820 and invoke those custom installation programs listed in generic installation file 820. Having modified configuration files 220 to reference generic installation program 720 which acts upon generic installation file 820 allows the system to perform custom modifications upon the user's first invocation of the operating system without changing the operating system files during manufacture of each custom system. Also included in custom components 175 are graphic files 830 and applications 840 which are used by custom installation program 810 as explained below.

Figure 9:
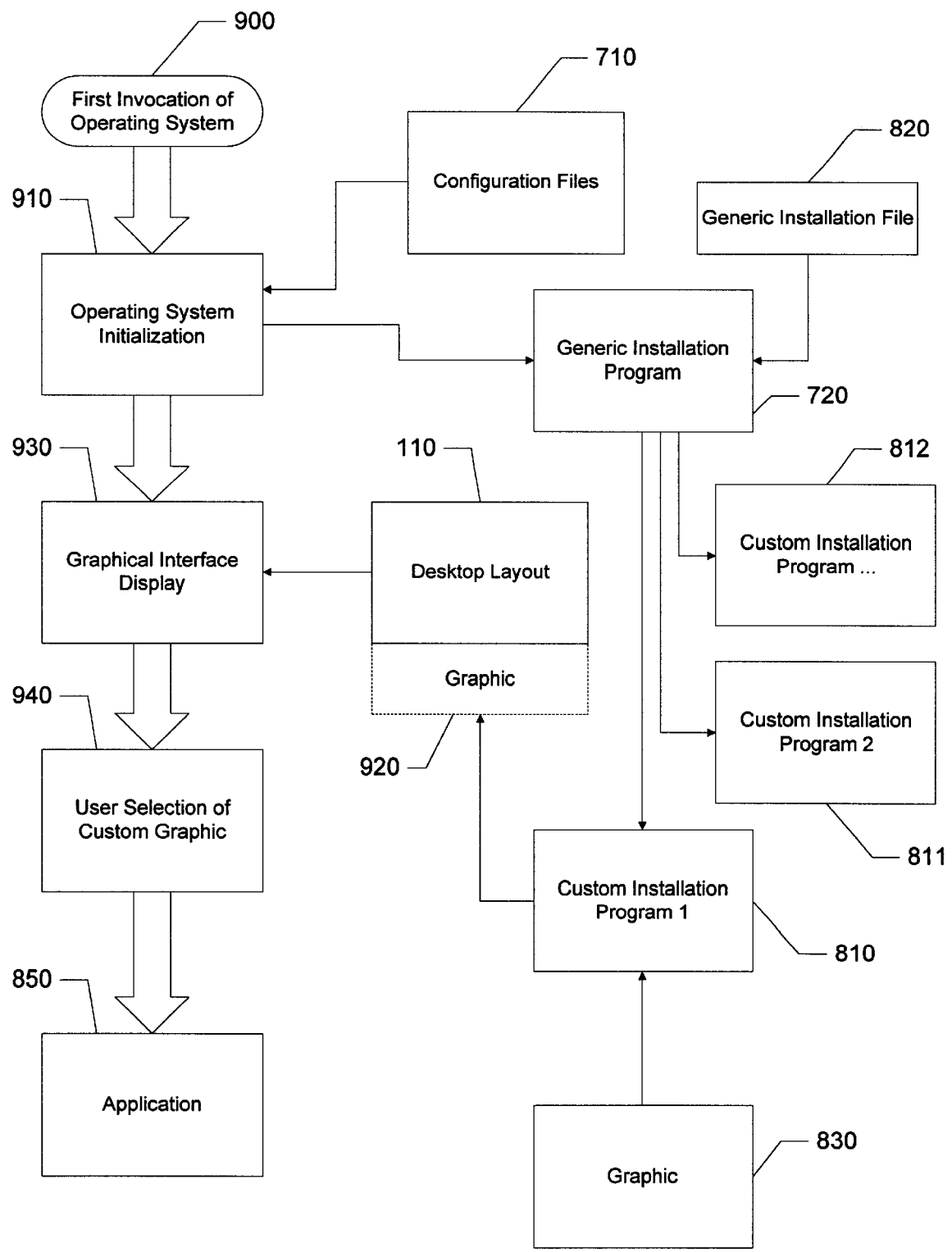
FIG. 9 is a block diagram depicting usage of installed files by the end user's computer system during a first invocation of the operating system.

FIG. 9 shows the program calls and functions during first execution 900 by the end user following the setup procedures described above. Upon first execution 900, operating system initialization 910 begins initialization of the operating system by reading configuration files 710. At least one entry in configuration files 710 causes the operating system to invoke generic installation program 720. Generic installation program 720 determines which, if any, custom installation programs 810, 811, 812 . . . need to be invoked to customize the operating system for the end user. If no entries exist in generic installation file 820 (i.e., no customization was prepared by the manufacturer), then generic installation program 720 exits and graphical interface display 930 is performed by the operating system by reading the desktop layout 110 and displaying the graphical interface display 930 to the end user.

If entries do exist in generic installation file 820, then custom installation programs 810 relating to the entries are called and executed by the operating system. Any number of these custom installation programs may modify desktop layout 210 with graphics previously stored in graphics files 830 during the custom installation process described above. Custom installation program 810 modifies desktop layout 110 using data from custom graphic file 830 forming custom graphic 920 on desktop layout 210. Following the termination of the last custom installation program 812, control is returned to generic installation program 720 which in turn exits, returning control to operating system initialization 910. Upon completion of operating system initialization 910, graphical interface display 930 is displayed to user. Graphical interface display 930 reads files comprising the desktop layout including original desktop layout 110 and custom graphic image 920.

When the end user views the desktop for the first time, the standard graphics along with the custom graphics are visible. The end user can now select custom graphic 920 using a pointing device (i.e., trackball or mouse) or keyboard. When custom graphic 920 is selected by the end user, the operating system invokes custom application 850 associated with custom graphic 920. In many graphical based operating systems, including those referenced above, the association between custom graphic 920 and custom application 850 is through properties assigned to custom graphic 920 that were set during the foregoing custom graphic installation process.

The description of the invention set forth herein is illustrative and not intended to limit the scope of the invention as set forth in the following claims. Variations and modifications of the embodiments disclosed herein may be made based on the descriptions set forth herein, without departing from the scope and spirit of the invention as set forth in the following claims.

What is claimed is:

1. A method of establishing a customized user interface for a computer stem, the method comprising:

installing a standard operating system and a generic installation program on a nonvolatile storage device included in the computer;

customizing configuration files;

installing the customized configuration files on the nonvolatile storage device, wherein the customized configuration files contain instructions for the operating system to execute the generic installation program upon the first execution of the operating system by the end user and wherein the customized configuration files instruct the operating system to call a customized installation program upon the first invocation of the operating system by the end user; and installing custom components, including a customized installation program and a customized graphics file, on the nonvolatile storage device.

2. A method of establishing a customized graphical user interface for a computer system as defined in claim 1, wherein the customized installation program is programmed to search the nonvolatile storage memory for other customized components.

3. A method of establishing a customized graphical user interface for a computer system as defined in claim 2, wherein the customized installation program is programmed to search for other customized components by operating on a data file that includes installation details about other customized components.

4. A method of establishing a customized graphical user interface for a computer system as defined in claim 2, wherein the installation program is programmed to mask error messages encountered when searching for customized components.

5. A method of establishing a customized graphical user interface for a computer system as defined in claim 1, wherein the customized installation program is programmed to remove icons or programs that are included with the operating system.

6. A method of establishing a customized graphical user interface for a computer system as defined in claim 1, wherein the configuration files are customized prior to creating a disk image that is copied to the nonvolatile storage device by a manufacturing computer system.

7. A method of establishing a customized graphical user interface for a computer system as defined in claim 6, wherein the customized installation program is programmed to search for other customized components by operating on a data file that includes installation details about other customized components.

8. A method of establishing a customized graphical user interface for a computer system as defined in claim 1, wherein the configuration files are customized during installation of custom components.

9. A method of establishing a customized graphical user interface for a computer system as defined in claim 8, wherein the configuration files are modified with desktop components during installation of custom components.

10. A method of establishing a customized graphical user interface for a computer system as defined in claim 8, wherein the customized installation program is programmed to search for other customized components by operating on a data file that includes installation details about other customized components.

11. A method of establishing a customized graphical user interface for a computer system as defined in claim 1, further comprising:

causing the operating system to execute;

causing the operating system to read configuration data from the customized configuration files; and causing the operating system to execute the customized installation program and, thereby, to install customized desktop components.

12. A method of establishing a customized graphical user interface for a computer system as defined in claim 11, wherein the installation program reads desktop component information that includes one or more graphical images associated with the desktop components and modifies a desktop layout used by the operating system.

13. A method of establishing a customized graphical user interface for a computer system as defined in claim 1, wherein the customized configuration files form a registry that contains at least one run-once key, the method further comprising:

(a) causing the operating system to read a run-once key; and (b) if the run-once key is set, causing the operating system to execute a desktop customization process that includes:

(i) read desktop component information;

(ii) modify a desktop layout; and (iii) display a customized desktop.

14. A method of establishing a customized graphical user interface for a computer system as defined in claim 13, the method further comprising:

(c) assuring that (b)(i), (ii), and (b)(iii) are performed only once.

15. A method of establishing a customized graphical user interface for a computer system as defined in claim 14, wherein the run-once key is removed from the registry upon completion of the desktop customization process.

16. A method of establishing a customized graphical user interface for a computer system as defined in claim 14, wherein configuration files are modified by the installation program during a first invocation of the operating system so that a run-once is not read subsequent to modification of the configuration files by the installation program.

17. A method of establishing a customized graphical user interface for a computer system as defined in claim 1, wherein the customized configuration files form a registry that maintains a profile for each of a plurality of users and wherein the respective profile for each user comprises a desktop layout and a run-once key for the respective user, the method further comprising:

executing the operating system;

accepting a unique user identification; and with reference to the user's run-once key, assuring that the user's desktop layout is customized.

18. A method of establishing a customized graphical user interface for a computer system as defined in claim 1, further comprising:

maintaining a file that comprises matched data pairs, each matched data pair comprising a user identification and an associated flag; and setting a user flag when the respective user's desktop layout has been customized.

19. A computer program product including instructions and data written onto a computer-readable medium, the computer program product comprising:

an operating system;

graphics files;

a generic installation program for determining a custom installation program that is required to be invoked;

a desktop layout;

customized configuration files including instructions to cause the operating system to execute the generic installation program;

at least one custom installation program to be called by the operating system to customize the desktop layout using data contained in the graphics files; and a generic installation file containing a reference to each custom installation program.

20. A computer program product as defined in claim 19, wherein the customized configuration files form a registry that contains at least one run-once key and wherein the operating system is programmed to:
  (a) read the run-one key; and
  (b) if the run-once key is set:
    (i) read desktop component information;
    (ii) modify a desktop layout; and
    (iii) display a customized desktop.

21. A computer system comprising:
  a processor;
  a memory coupled to the processor;
  a nonvolatile storage device;
  a display device;
  an operating system installed on the nonvolatile storage device;
  a generic installation program installed on the nonvolatile storage device;
  a customized installation program;
  customized configuration files stored on the nonvolatile storage device, wherein the customized configuration files contain instructions for the operating system to execute the generic installation program upon the first execution of the operating system and wherein the customized configuration files contain instructions to the operating system to call the customized installation program upon the first invocation of the operating system; and
  a customized graphics file.

22. A computer system as defined in claim 21, wherein the customized installation program is programmed to search the nonvolatile memory for other customized components.

23. A computer system as defined in claim 22, wherein the customized installation program is programmed to search for other customized components by operating on a data file that includes installation details about the other customized components.

24. A computer system as defined in claim 22, wherein the installation program is programmed to mask error messages encountered when searching for customized components.

25. A computer system as defined in claim 21, wherein the customized installation program is programmed to remove icons or programs that are included with the operating system.

26. A computer system as defined in claim 21, wherein the customized configuration files form a registry that contains at least one run-once key and wherein the operating system is programmed to:
  (a) read the run-once key; and
  (b) if the run-once key is set:
    (i) read desktop component information;
    (ii) modify a desktop layout, and
    (iii) display a customized desktop.

27. A computer system as defined in claim 26, wherein the operating system is programmed to assure that (b)(i), (b)(ii) and (b)(iii) are performed only once in respect of a specific user.

28. A system for manufacturing a customized computer product, the system comprising:
  installation means for copying a disk image onto a target computer, the disk image including an operating system and a generic installation program; and
  first customization means for installing customized configuration files on the target computer, wherein the customized configuration files contain instructions for the operating system to execute the generic installation program upon the first invocation of operating system by an end user and contain instructions to the operating system to call a customized installation program upon the first invocation of the operating system by the end user; and
  second customization means for installing custom components, including the customized installation program and customized graphics files, on the target computer.

29. A computer system as defined in claim 28, wherein the customized registration files form a registry that contains at least one run-once key and wherein the operating system is programmed to:
  (a) read the run-once key; and
  (b) if the run-once key is set:
    (i) read desktop component information;
    (ii) modify a desktop layout, and
    (iii) display a customized desktop.

30. A computer system as defined in claim 29, wherein the operating system is programmed to assure that (b)(i), (b)(ii) and (b)(iii) are performed only once in respect of a specific user.

* * * * *